United States Patent [19]
Kim et al.

[11] Patent Number: 5,463,572
[45] Date of Patent: Oct. 31, 1995

[54] MULTI-NARY AND LOGIC DEVICE

[75] Inventors: Jin-Up Kim; Sun-Young Kim, both of Daejeon, Rep. of Korea

[73] Assignee: Electronics and Telecommunications Research Institute, Rep. of Korea

[21] Appl. No.: 357,246

[22] Filed: Dec. 13, 1994

[30] Foreign Application Priority Data

Nov. 15, 1994 [KR] Rep. of Korea ............. 94-29917

[51] Int. Cl.$^6$ .................................. G06F 7/00
[52] U.S. Cl. ......................... 364/746.2; 364/768
[58] Field of Search ................. 364/746.2, 768; 341/56, 57; 326/59, 60

[56] References Cited

U.S. PATENT DOCUMENTS 3,628,000 12/1971 Weiss .................................. 364/773
5,280,440 1/1994 Sugimura ......................... 364/746.2

Primary Examiner—Tan V. Mai
Attorney, Agent, or Firm—Larson & Taylor

[57] ABSTRACT

An AND logic operation rule capable of carrying out an AND logic operation between binary digits and an AND logic operation between multi-nary digits is defined and an AND logic device utilizing the AND logic operation is disclosed. The AND logic operator having three multi-nary logic inputs consists of two multi-nary AND logic operators having two inputs, respectively. The multi-nary AND logic operator carries out the function of the prior binary AND logic operation and the function of the binary-multi-nary AND logic operation.

1 Claim, 4 Drawing Sheets

FIG.1
| AND | 0 | 1 |
|---|---|---|
| 0 | 0 | 1 |
| 1 | 1 | 1 |
FIG.2
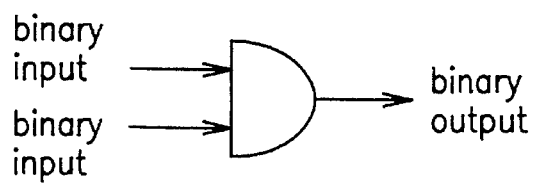
FIG.3
| ⊗ | 0 | 1 | ··· | j | ··· | A |
|---|---|---|---|---|---|---|
| 0 | 0 | 0 | ··· | 0 | ··· | 0 |
| 1 | 0 | 1 | | j | | A |
| ⋮ | ⋮ | | | ⋮ | | ⋮ |
| i | 0 | i | | ij | | iA |
| ⋮ | ⋮ | | | ⋮ | | ⋮ |
| B | 0 | B | ··· | jB | ··· | AB |
FIG.4
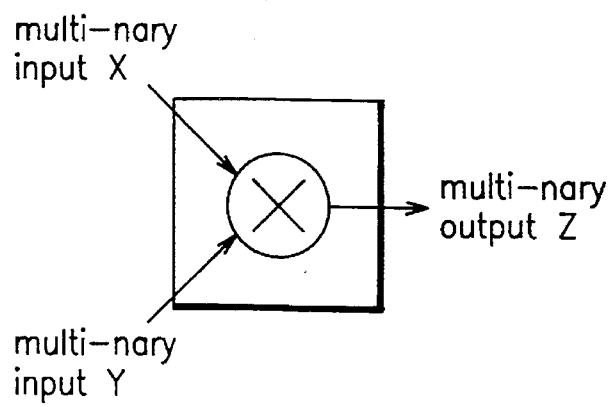

5,463,572

MULTI-NARY AND LOGIC DEVICE

BACKGROUND OF THE INVENTION

The present invention relates to an AND logic device in case where an AND logic operator has inputs of multi-nary logic signals.

Recently, most of electronic apparatus are based on a digital signal process for processing a signal in digital.

Herein, the digital signal process is signal process method which processes an analog signal to digital data suitable to the object through an analog to digital converter, thereby obtaining the desired result.

In general, the digital signal is indicated in a binary digit and the logic device for implementing logic operation between the binary digits has been frequently used in a digital signal processing apparatus. The prior AND logic device of logic devices carries out the AND logic only with reference to binary digits.

FIG. 1 shows a table of a conventional binary AND logic operation. A binary AND logic operation symbol is designated as a conventional product symbol (•), but the present invention designates it as (⊙) so as to distinguish with an arithmetic product symbol (•) and it is illustrated as shown in FIG. 2.

The truth table according to a binary AND logic indicates an input and an output of a binary AND logic operator.

Thus, referring to FIG. 2, in case where if two inputs are logic "0"s and two inputs are logic "1" and logic "0", respectively, the output becomes logic "0" and in case where two inputs are logic "1", the output becomes "1".

Herein, logic "1" or logic "0" designates logic value "1" or "0" and actually it is used by mapping with an actual electric signal such as +1 volt, −1 volt.

Said binary OR logic operator has been used in most of a digital circuits indicating in a series of binary digits.

However, how does the AND logic operator carry out an AND logic operation in case where two inputs of the AND logic operator are not binary logic values.

Actually, as above mentioned, the output of the binary AND logic operator with reference to the binary logic value has a binary logic value, but the binary logic value is converted into a multi-nary logic value, after an arithmetic operation such as an arithmetic OR of the binary logic values (arithmetic add) or an arithmetic AND of the binary logic values (arithmetic product) was carried out.

Several binary logic operators should be used to process said multi-nary logic value.

SUMMARY OF THE INVENTION

Accordingly, it is an object of the present invention to define an AND logic operation rule capable of carrying out an AND logic operation between multi-nary logic values as well as an AND logic operation between binary logic values and to provide an AND logic device in accordance with the AND logic operation.

The other objects and features of the present invention can be achieved by providing a multi-nary AND logic device for carrying out a multi-nary AND logic operation of k (herein, k is an integer) binary inputs and one binary input, said k binary inputs and one binary input having the designated bits, respectively, comprising an arithmetic summer for sequentially summing the k binary inputs inputted in bit units, thereby calculating the multi-nary logic value corresponding to said k binary inputs; and an AND logic operator for receiving the output of the arithmetic summer and the binary input.

BRIEF DESCRIPTION OF THE DRAWINGS

FIG. 1 is a truth table of a binary AND logic operation.

FIG. 2 shows a binary AND logic operator.

FIG. 3 is a truth table of a multi-nary AND logic operation in accordance with the present invention.

FIG. 4 shows a multi-nary AND logic operator having two multi-nary inputs in accordance with the present invention.

DETAILED DESCRIPTION OF THE INVENTION

FIG. 3 shows a truth table of a multi-nary AND logic having two multi-nary inputs X and Y and a multi-nary output Z.

Referring to FIG. 3, the input X may have from a logic value of 0 to a logic value of A (Herein, A is a positive integer) and the input B may have from a logic value of 0 to a logic value of B (Herein, B is a positive integer).

As shown in the truth table of the multi-nary AND logic of FIG. 3, in case where the logic value of the input X is j and the logic value of the input Y is i, the output Z of the multi-nary AND logic becomes ij.

The output of said multi-nary AND logic operator may have the range of from a logic value of 0 to a logic value of AB.

For example, in the truth table of FIG. 3, in case where the value of A is 9 and the value of B is 19, if the input X has the value of 5 and the input Y has the value of 12, j becomes 5 and i becomes 12, so that the logic value of the output Z becomes ij= 12*5=60.

At this time, the obtained logic value of 60 should be between 0 and AB=9*19=171 which is obtainable value by the multi-nary logic operator.

FIG. 4 shows a configuration of a multi-nary AND logic operator in accordance with above truth table of FIG. 3.

The multi-nary AND logic device having plural inputs can be constructed by use of plural multi-nary AND logic operators having two inputs, respectively.

Figure 5:
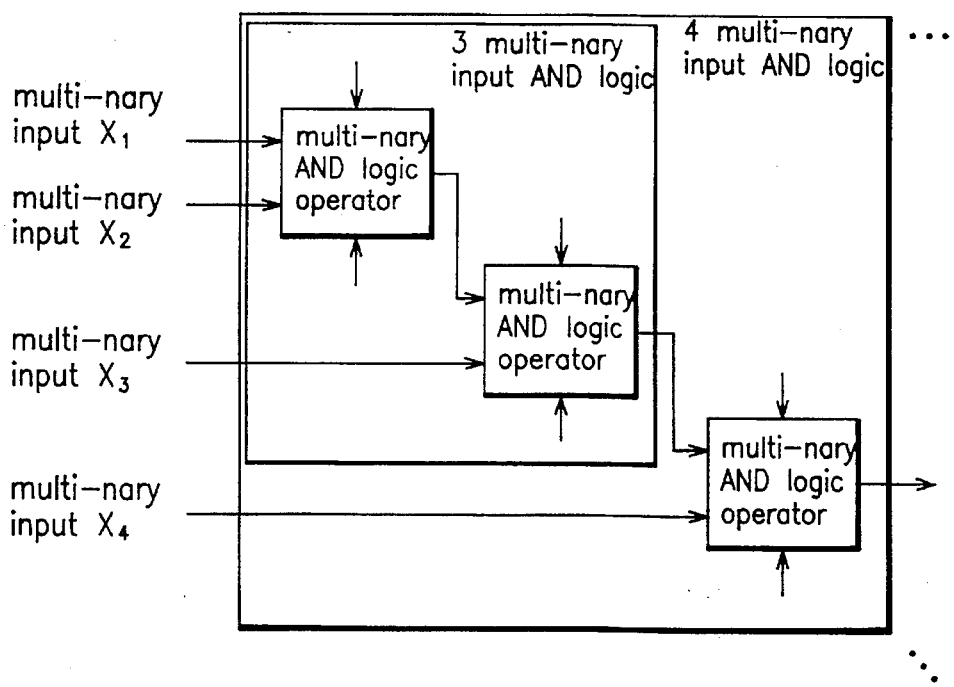
FIG. 5 shows a multi-nary AND logic device having plural multi-nary inputs in accordance with the present invention.

FIG. 5 shows a configuration of a multi-nary AND logic device having plural multi-nary inputs.

Thus, an AND logic device having three multi-nary logic inputs consists of two AND logic operators having two inputs, respectively.

The multi-nary AND logic device includes an operation function of the prior binary AND logic operator.

Thus, supposed that above-mentioned multi-nary inputs X and Y are binary inputs, the values of A and B become 1. If it substitutes for A=1 and B=1 in the truth table of the multi-nary AND logic as shown in FIG. 3, the same result as the truth table of the binary AND operation logic operator as shown in FIG. 1 can be obtained.

In order to exemplify the use of the multi-nary AND logic operator, it cites an example of the binary-multi-nary AND logic operator that one of two inputs has a binary logic value and the other has a multi-nary logic value.

Figure 6:
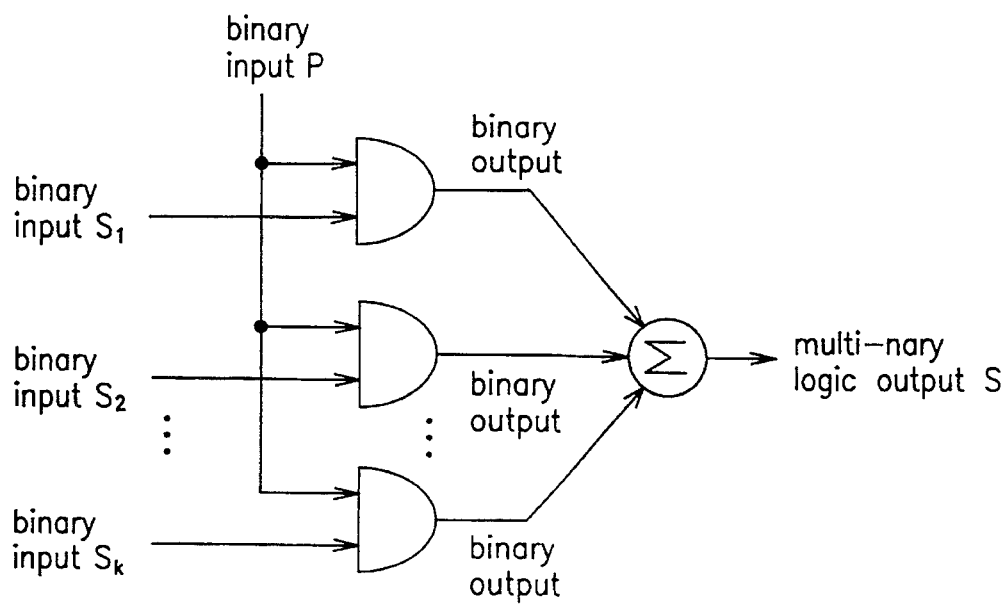
FIG. 6 shows a conventional binary-multi-nary AND logic operator having plural binary inputs in accordance with the present invention.

Refers to FIG. 6 utilizing the prior binary AND logic operator. Herein, if $S_i$ (i=1, 2, ..., k: k is any positive integer) and the P are binary input signals, the output S of the logic circuit can be expressed as the following equation.

$$S = \sum_{i=1}^{k} (S_i \mathbb{P} P) \quad (1)$$

In FIG. 6, in order to calculate the foregoing equation, one arithmetic summer capable of arithmetically summing k binary inputs and k AND logic operators are necessary.

Figure 7:
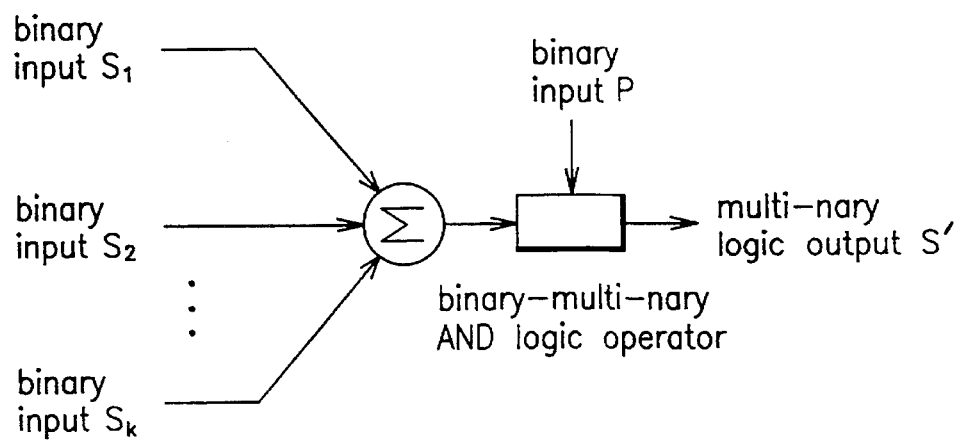
FIG. 7 shows a binary-multi-nary AND logic device in accordance with a first embodiment of the present invention.

In case where one binary-multi-nary AND logic operator is used to calculate the equation (1), as shown in FIG. 7, a logic circuit consists of one binary-multi-nary AND logic operator and one arithmetic summer.

The output of the binary-multi-nary AND logic circuit as shown in FIG. 7 is expressed as the following equation (2).

$$S' = \left( \sum_{i=1}^{k} S_i \right) \boxtimes P \quad (2)$$

Herein, $\boxtimes$ is defined as an operation symbol of the binary multi-nary AND logic.

Therefore, if the S and S' have the identical values in the above two equations, the prior method of FIG. 6 for embodying the digital operation of the equation (1) can be embodied as shown in FIG. 7.

Thus, the combination of the binary AND logic operators can be converted into the binary multi-nary AND logic operator.

Because the arithmetic add and the binary AND logic operation are a linear operator, the exchange and distribution rules of the operator are realized, so that the equations can be verified.

In order to verify that the two equations are identical, S and S' are compared in case where k=3 and $S_1$=100110101, $S_2$=011001010, $S_3$=110101100, and P=010110010.

First, the value Of S calculated by the equation (1) is as follows.

$$\begin{aligned} S &= (100110101) \mathbb{P} (010110010) + (011001010) \mathbb{P} \\ &\quad (010110010) + (110101100) \mathbb{P} (010110010) \\ &= (000110000) + (010000010) + (010100000) \\ &= (020210010) \end{aligned} \quad (3)$$

Also, the value of S' calculated by the equation (2) is as follows.

$$\begin{aligned} S' &= [(100110101) + (011001010) + (110101100)] \\ &\quad \boxtimes (010110010) \\ &= (221212211) \boxtimes (010110010) \\ &= (020210010) \end{aligned} \quad (4)$$

Accordingly, it is found that the calculated results from two equations (3) and (4) are identical.

As above mentioned, in case where the prior binary AND logic operation is substituted for the binary-multi-nary AND logic operation, it has an advantage that many binary AND logic operators can be reduced as known by comparing FIGS. 6 and 7.

Although the above example cites the logic circuit consisting of the prior binary-multi-nary AND logic operator and the arithmetic summer, it is applicable to the logic circuit consisting of a binary AND logic operator and an arithmetic summer.

The binary-multi-nary AND logic operator may be regarded as extension of the prior binary AND logic operator that one of two inputs is the multi-nary input.

The above descriptions is disclosed in Korea patent No.93- 25911 and is a method that can reduce many binary AND logic operators by embodying the configuration of the digital circuit related to the prior binary AND logic operator by use of the binary-multi-nary AND logic operator.

However, in the binary-multi-nary AND logic operator, one of two inputs is a binary input and the other is a multi-nary input.

Therefore, it is slightly restricted on application of the binary-multi-nary AND logic operator, because one of two inputs is restricted as the binary input.

Accordingly, the present invention proposes the further useful and inclusive method which extends the binary input into the multi-nary input so as to remove the restriction.

If the binary input of the binary-multi-nary AND logic operator is further extended into the multi-nary input, the multi-nary AND logic operator can be constructed as shown in FIGS. 3 and 4.

Hereinafter, it cites an example of multi-nary-multi-nary AND logic operator based on the logic circuit consisting of a binary multi-nary AND logic operator. Herein, the case that two inputs are multi-nary, is explained as the multi-nary AND logic operator.

Figure 8:
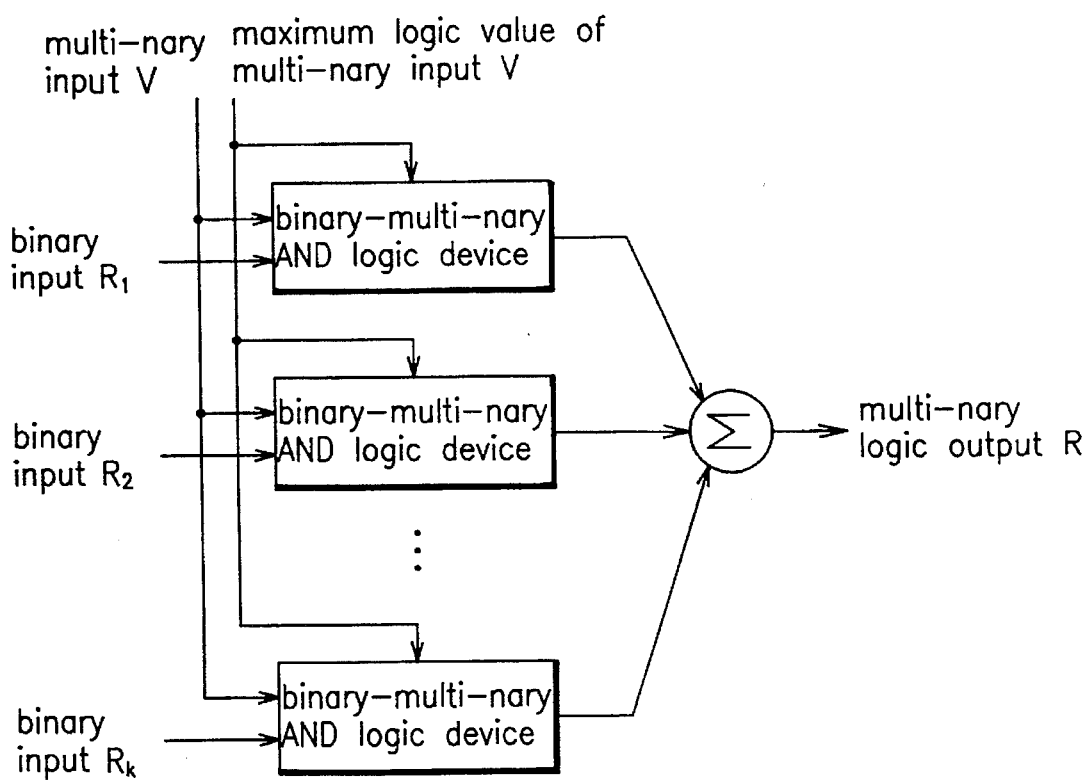
FIG. 8 shows a binary-multi-nary AND logic device in accordance with a second embodiment of the present invention.

It cites the logic circuit utilizing the binary-multi-nary AND logic operator of FIG. 8 which has the same configuration as that of FIG. 6.

Herein, when $R_i$ (i=1,2, ..., k: k is any positive integer) is a binary input signal and V is a multi-nary input signal, the output R of the logic circuit can be expressed as the following equation.

$$R = \sum_{i=1}^{k} (R_i \boxtimes V) \quad (5)$$

Figure 9:
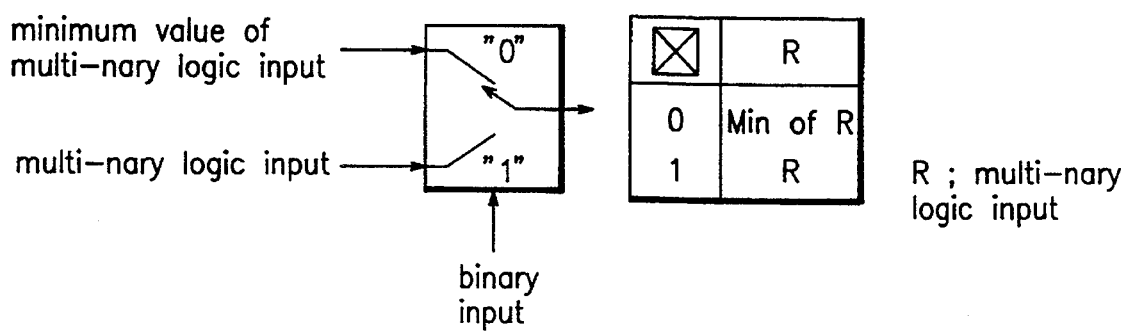
FIG. 9 shows a binary-multi-nary AND logic operator having two multi-nary inputs and a truth table thereof in accordance with the present invention.

Herein, because the logic circuit is based on the binary-multi-nary operator, a truth table of the binary- multi-nary AND logic device as shown in FIG. 9 can be derived from the truth table of the multi-nary AND logic operator of FIG. 3. In particular, as shown in FIG. 9, the binary-multi-nary AND logic device can be constructed simpler than the multi-nary AND logic device of FIG. 4

K binary-multi-nary AND logic operators and one arithmetic summer are necessary to calculate the foregoing equation (5).

Figure 10:
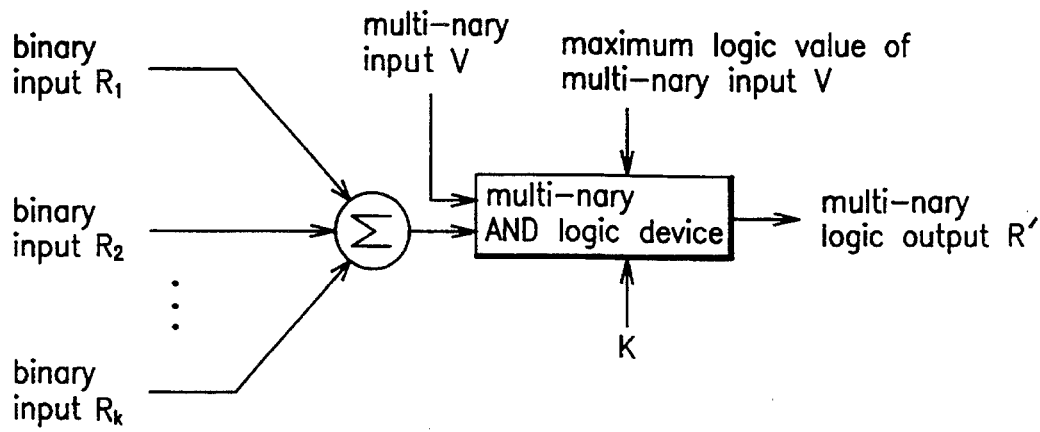
FIG. 10 shows a binary-multi-nary AND logic device in accordance with a third embodiment of the present invention.

However, if the multi-nary AND logic operator is used for calculating the foregoing equation (5), the logic circuit consists of one multi-nary AND logic operator and one arithmetic summer as shown in FIG. 10.

The output of FIG. 10 can be expressed as the following equation (6).

$$R' = \left( \sum_{i=1}^{k} R_i \right) \otimes V \quad (6)$$

Herein, $\otimes$ is defined as an operation symbol of the multi-nary-multi-nary AND logic.

Therefore, if the R has the identical value with R' in above two equations, the combination of the binary-multi- nary AND logic operators can be converted into the multi-nary AND logic operator.

Because the arithmetic add operation and the AND logic operation are a linear operator, the exchange and distribution rule of the operator are realized, so that the equations can be verified.

In order to verify that the two equations are identical, R and R' are compared in case where k=3 and $R_1$=100110101, $R_2$=011001010, $R_3$=110101100, V=032521433 and the maximum value of V is 5.

First, the value of R in the equation (5) is calculated in accordance with the truth table of FIG. 9 as follows.

$$\begin{aligned} R &= (100110101) \boxtimes (032521433) + (011001010) \boxtimes \\ &\quad (032521433) + (110101100) \boxtimes (032521433) \\ &= (000520403) + (032001030) + (030500400) \\ &= (062A21833) \end{aligned} \quad (7)$$

Also, the value of R' in the equation (6) is calculated in accordance with the truth table of the multi-nary AND logic in case of B=3 and A=5 in FIG. 3.

$$\begin{aligned} R' &= [(100110101) + (011001010) + (110101100)] \otimes \\ &\quad (032521433) \\ &= (221212211) \otimes (032321433) \\ &= (062A21833) \end{aligned} \quad (8)$$

Accordingly, it is found that two calculated results from two equations (7) and (8) have the identical values. According to the present invention, it has many advantage on circuit in case where a binary-multi-nary AND logic device is applied to the logic circuit consisting of a prior binary AND logic operator combined with an arithmetic operator. Thus, the configuration is very simple and the circuit can be economically designed.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A multi-nary AND logic device for carrying out the multi-nary AND logic operation of k (herein, k is an integer) binary inputs and one binary input, said k binary inputs and one binary input having the designated bits, respectively, comprising:

an arithmetic summer for sequentially summing the k binary inputs inputted in bit units, thereby calculating a multi-nary logic value corresponding to the binary inputs; and a binary-multi-nary AND logic operator for receiving the output of the arithmetic summer and the binary input.

* * * * *